US012340741B2

(12) United States Patent
Kim

(10) Patent No.: US 12,340,741 B2
(45) Date of Patent: Jun. 24, 2025

(54) RATED VOLTAGE TRANSFER LINE AND RATED VOLTAGE TRANSFER SYSTEM INCLUDING THE SAME

(71) Applicant: Samsung Display Co., Ltd., Yongin-Si (KR)

(72) Inventor: Min-Woo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/520,211

(22) Filed: Nov. 27, 2023

(65) Prior Publication Data

US 2024/0233632 A1 Jul. 11, 2024

(30) Foreign Application Priority Data

Jan. 5, 2023 (KR) ........................ 10-2023-0001883

(51) Int. Cl.
*G09G 3/3225* (2016.01)

(52) U.S. Cl.
CPC ... *G09G 3/3225* (2013.01); *G09G 2300/0426* (2013.01); *G09G 2310/0278* (2013.01); *G09G 2310/08* (2013.01); *G09G 2330/028* (2013.01); *G09G 2330/06* (2013.01)

(58) Field of Classification Search
None
See application file for complete search history.

(56) References Cited

U.S. PATENT DOCUMENTS 6,191,647 B1 2/2001 Tanaka et al.

*Primary Examiner* — Andre L Matthews
(74) *Attorney, Agent, or Firm* — Innovation Counsel LLP

(57) ABSTRACT

A rated voltage transfer line includes: a rated voltage application part to which a first rated voltage is applied, at least one capacitor including a first terminal connected to the rated voltage application part and a second terminal that is grounded, a branch line part including a branch part electrically connected to the rated voltage application part and first and second branch lines branching and extending from the branch part, a first contact part electrically connected to a first end of the first branch line spaced apart from the branch part, and a second contact part electrically connected to a first end of the second branch line spaced apart from the branch part.

19 Claims, 15 Drawing Sheets

RATED VOLTAGE TRANSFER LINE AND RATED VOLTAGE TRANSFER SYSTEM INCLUDING THE SAME

CROSS-REFERENCE TO RELATED APPLICATION

This application claims priority to and benefits of Korean Patent Application No. 10-2023-0001883 under 35 U.S.C. § 119, filed on Jan. 5, 2023 in the Korean Intellectual Property Office (KIPO), the entire contents of which are hereby incorporated by reference.

BACKGROUND

1. Field

Embodiments relate generally to a rated voltage transfer line and rated voltage transfer system. More particularly, embodiments relate to a display device providing visual information.

2. Description of the Related Art

A display device is a device that displays an image and may include pixels arranged in a display area. At least one driver generating a plurality of driving signals for driving the pixels and a timing controller generating a driving control signal for driving the drivers may be disposed around the display area.

The timing controller may include a block that generates the driving control signal. A plurality of blocks may be provided, and in this case, the plurality of blocks may generate different types of driving control signals.

In order to generate the driving control signal in the timing controller, power needs to be supplied to the timing controller. To this end, a power net that supplies power to the timing controller may be disposed around the display area. The power net may include a plurality of power sources, and each of the plurality of power sources may generate power.

A space in which the power net can be disposed in the display device may be limited. Accordingly, at least one of the plurality of power sources needs to be electrically connected to two or more blocks. In this case, noise may occur between blocks electrically connected to the same power source, and thus, display quality of the display device may be degraded.

SUMMARY

Embodiments provide a rated voltage transfer line capable of improving display quality.

Embodiments provide a rated voltage transfer system including the rated voltage transfer line.

A rated voltage transfer line according to embodiments of the present disclosure includes a rated voltage application part, at least one capacitor, a branch line part, a first contact part, and a second contact part. A first rated voltage is applied to the rated voltage application part. The at least one capacitor includes a first terminal connected to the rated voltage application part and a second terminal that is grounded. The branch line part includes a branch part electrically connected to the rated voltage application part and first and second branch lines branching and extending from the branch part. The first contact part is electrically connected to a first end of the first branch line spaced apart from the branch part, and a second contact part is electrically connected to a first end of the second branch line spaced apart from the branch part.

In an embodiment, the rated voltage transfer line may further include at least one rated voltage transfer electrode disposed between the rated voltage application part and the branch part, and electrically connecting the rated voltage application part and the branch part to each other.

In an embodiment, the rated voltage transfer line may further include at least one first bridge electrode disposed between the first contact part and the first end of the first branch line, and electrically connecting the first contact part and the first end of the first branch line to each other and at least one second bridge electrode disposed between the second contact part and the first end of the second branch line, and electrically connecting the second contact part and the first end of the second branch line to each other.

In an embodiment, each of a length of a first voltage transfer path defined as a path through which the first rated voltage output from the rated voltage application part is transferred to the first contact part and a length of a second voltage transfer path defined as a path through which the first rated voltage output from the rated voltage application part is transferred to the second contact part may be smaller than a length of a noise voltage transfer path from the first contact part to the second contact part.

In an embodiment, the noise voltage transfer path may include a path sequentially passing through the first branch line, the branch part, and the second branch line.

In an embodiment, the first voltage transfer path may include a path sequentially passing through the branch part and the first branch line, and the second voltage transfer path may include a path sequentially passing through the branch part and the second branch line.

In an embodiment, the branch line part may further include a third branch line branching and extending from the branch part.

In an embodiment, the rated voltage transfer line may further include a third contact part electrically connected to a first end of the third branch line spaced apart from the branch part.

In an embodiment, a length of a third voltage transfer path defined as a path through which the first rated voltage output from the rated voltage application part is transferred to the third contact part may be smaller than a length of a first noise voltage transfer path from the third contact part to the first contact part and may be smaller than a length of a second noise voltage transfer path from the third contact part to the second contact part.

In an embodiment, the first noise voltage transfer path may include a path sequentially passing through the third branch line, the branch part, and the first branch line, and the second noise voltage transfer may include a path sequentially passing through the third branch line, the branch part, and the second branch line.

In an embodiment, the third voltage transfer path may include a path sequentially passing through the branch part and the third branch line.

In an embodiment, the rated voltage application part, the first contact part, and the second contact part may be disposed in a same layer as each other.

In an embodiment, the rated voltage application part, the first contact part, and the second contact part may be spaced apart from each other.

A rated voltage transfer system according to embodiments of the present disclosure includes a power net including a first power source the provides a first rated voltage, a timing controller including first and second blocks driven by the first rated voltage, and a rated voltage transfer line electrically connecting the first power source to each of the first and second blocks. The rated voltage transfer line may include a rated voltage application part, at least one capacitor, a branch line part, a first contact part, and a second contact part. The rated voltage application part is electrically connected to the first power source. The least one capacitor includes a first terminal connected to the rated voltage application part and a second terminal that is grounded. The branch line part includes a branch part electrically connected to the rated voltage application part and first and second branch lines branching and extending from the branch part. The first contact part is electrically connected to a first end of the first branch line spaced apart from the branch part and the first block. The second contact part is electrically connected to a first end of the second branch line spaced apart from the branch part and the second block.

In an embodiment, each of a length of a first voltage transfer path defined as a path through which the first rated voltage output from the rated voltage application part is transferred to the first contact part and a length of a second voltage transfer path defined as a path through which the first rated voltage output from the rated voltage application part is transferred to the second contact part may be smaller than a length of a noise voltage transfer path from the first contact part to the second contact part.

In an embodiment, the noise voltage transfer path may include a path sequentially passing through the first branch line, the branch part, and the second branch line.

In an embodiment, the first voltage transfer path may include a path sequentially passing through the branch part and the first branch line, and the second voltage transfer path may include a path sequentially passing through the branch part and the second branch line.

In an embodiment, the rated voltage application part, the first contact part, and the second contact part may be disposed in a same layer as each other.

In an embodiment, the rated voltage application part, the first contact part, and the second contact part may be spaced apart from each other.

A rated voltage transfer line according to an embodiment of the present disclosure may include a branch line part including first and second branch lines branching and extending from a branch part, a first contact part electrically connected to a first end of the first branch line spaced apart from the branch part, and a second contact part electrically connected to a second end of the second branch line spaced apart from the branch part. Accordingly, noise may not substantially occur between the first contact part and the second contact part.

A rated voltage transfer system according to an embodiment of the present disclosure may include a branch line part including first and second branch lines branching and extending from a branch part, a first contact part electrically connected to a first end of the first branch line spaced apart from the branch part and a first block, and a second contact part electrically connected to a second end of the second branch line spaced apart from the branch part and a second block. Accordingly, noise may not substantially occur between the first block electrically connected to the first contact part and the second block electrically connected to the second contact part.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
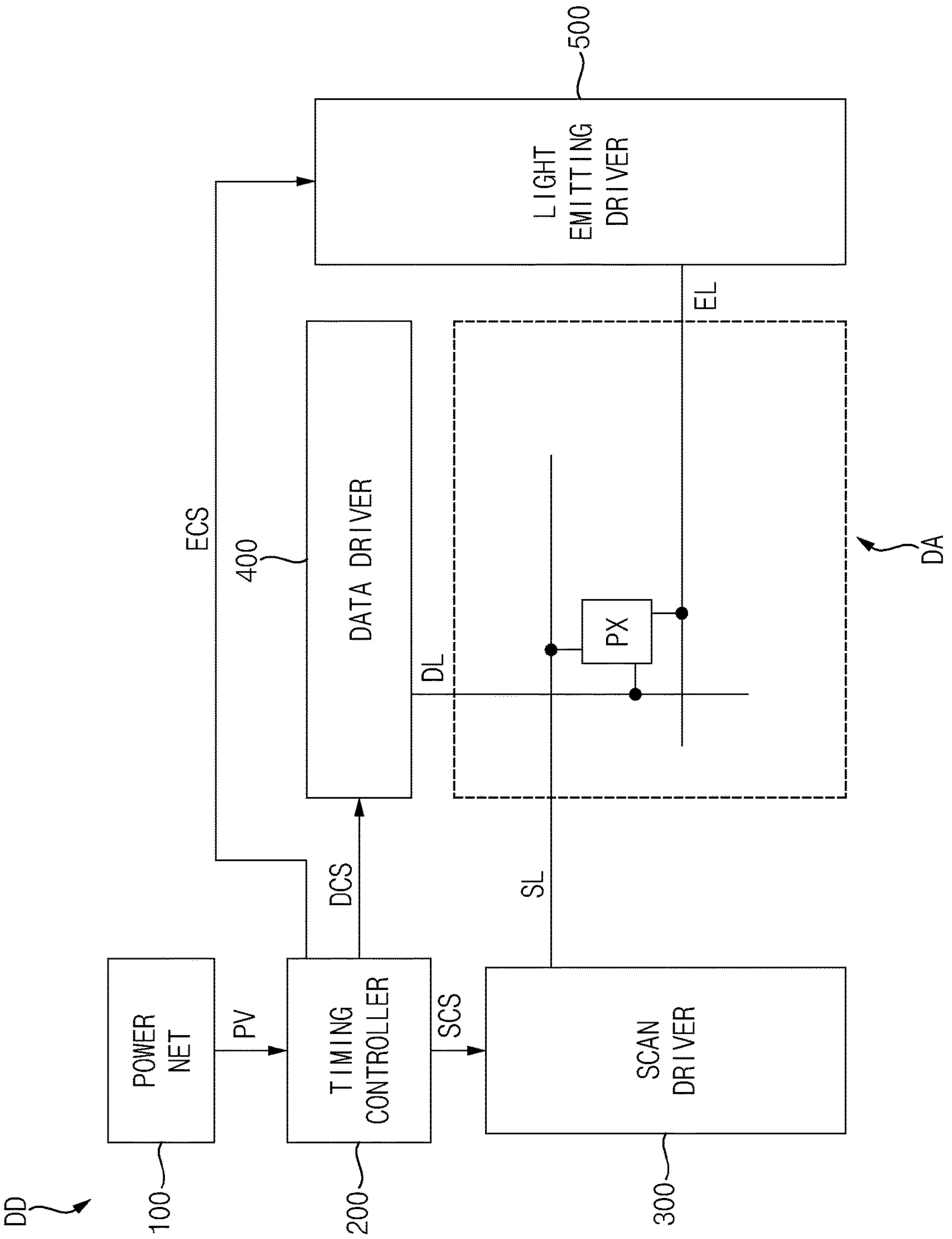
FIG. 1 is a view for explaining a display device according to an embodiment of the present disclosure.

Hereinafter, a rated voltage transfer line and a rated voltage transfer system including the same according to embodiments of the present disclosure will be explained in detail with reference to the accompanying drawings. The same reference numerals are used for the same components in the drawings, and redundant descriptions of the same components will be omitted.

FIG. 1 is a view for explaining a display device DD according to an embodiment of the present disclosure.

Referring to FIG. 1, the display device DD may include a power net 100, a timing controller 200, a scan driver 300, a data driver 400, a light emitting driver 500, and a pixel PX. The scan driver 300, the data driver 400, and the light emitting driver 500 are sometimes called the scan driving part 300, the data driving part 400, and the light emitting driving part 500, respectively.

The pixel PX may be defined as a minimum unit that emits light. The pixel PX may be disposed in the display area DA. In this case, a plurality of pixels PX may be provided in the display area DA, and the plurality of pixels PX may be entirely disposed in a display area DA.

The pixel PX includes various components for emitting light. For example, the pixel PX may include an organic light emitting element and a pixel circuit electrically connected to the organic light emitting element that generates a driving current.

The scan driver 300, the data driver 400, and light emitting driver 500 may be disposed around the display area DA. Each of the scan driver 300, the data driver 400, and light emitting driver 500 may be electrically connected to the pixel circuit to provide driving signals to the pixel circuit.

More specifically, the scan driver 300 may be electrically connected to the pixel PX through a scan line SL and may provide a scan signal to the pixel PX.

In addition, the data driver 400 may be electrically connected to the pixel PX through a data line DL, and may provide a data signal to the pixel PX.

In addition, the light emitting driver 500 may be electrically connected to the pixel PX through a light emitting control line EL, and may provide a light emitting control signal to the pixel PX.

The pixel PX may provide the driving current to the organic light emitting element based on the scan signal, the data signal, and the emission control signal, and accordingly, light may be emitted from the organic light emitting element.

The timing controller 200 may provide driving control signals to each of the scan driver 300, the data driver 400, and light emitting driver 500. Each of the scan driver 300, data driver 400, and light emitting driver 500 may generate corresponding one of the scan signal, the data signal, and the light emitting control signal based on the driving control signal.

More specifically, the timing controller 200 may provide a scan driving control signal SCS to the scan driver 300, and the scan driver 300 may generate the scan signal based on the scan driving control signal SCS.

In addition, the timing controller 200 may provide a data driving control signal DCS to the data driver 400, and the data driver 400 may generate the data signal based on the data driving control signal DCS.

In addition, the timing controller 200 may provide a light emitting driving control signal ECS to the light emitting driver 500, and the light emitting driver 500 may generate the light emitting control signal based on the light driving control signal ECS.

The power net 100 may provide a power PV to the timing controller 200. The timing controller 200 may generate the driving control signal by receiving the power PV.

In FIG. 1, three types of drivers 300, 400, and 500 are shown as an example, but the present disclosure is not limited thereto. For example, the display device DD may include four or more drivers for providing the driving signal or transmitting the driving signal.

In addition, although FIG. 1 illustrates three types of the driving control signals SCS, DCS, and ECS provided by the timing controller 200, the number of the driving control signals provided by the timing controller 200 is not limited thereto. For example, the driving control signal provided by the timing controller 200 may include four or more driving control signals. Or, for another example, each of the scan driving control signal SCS, the data driving control signal DCS, and the light emitting driving control signal ECS may include two or more driving control signals.

Figure 2:
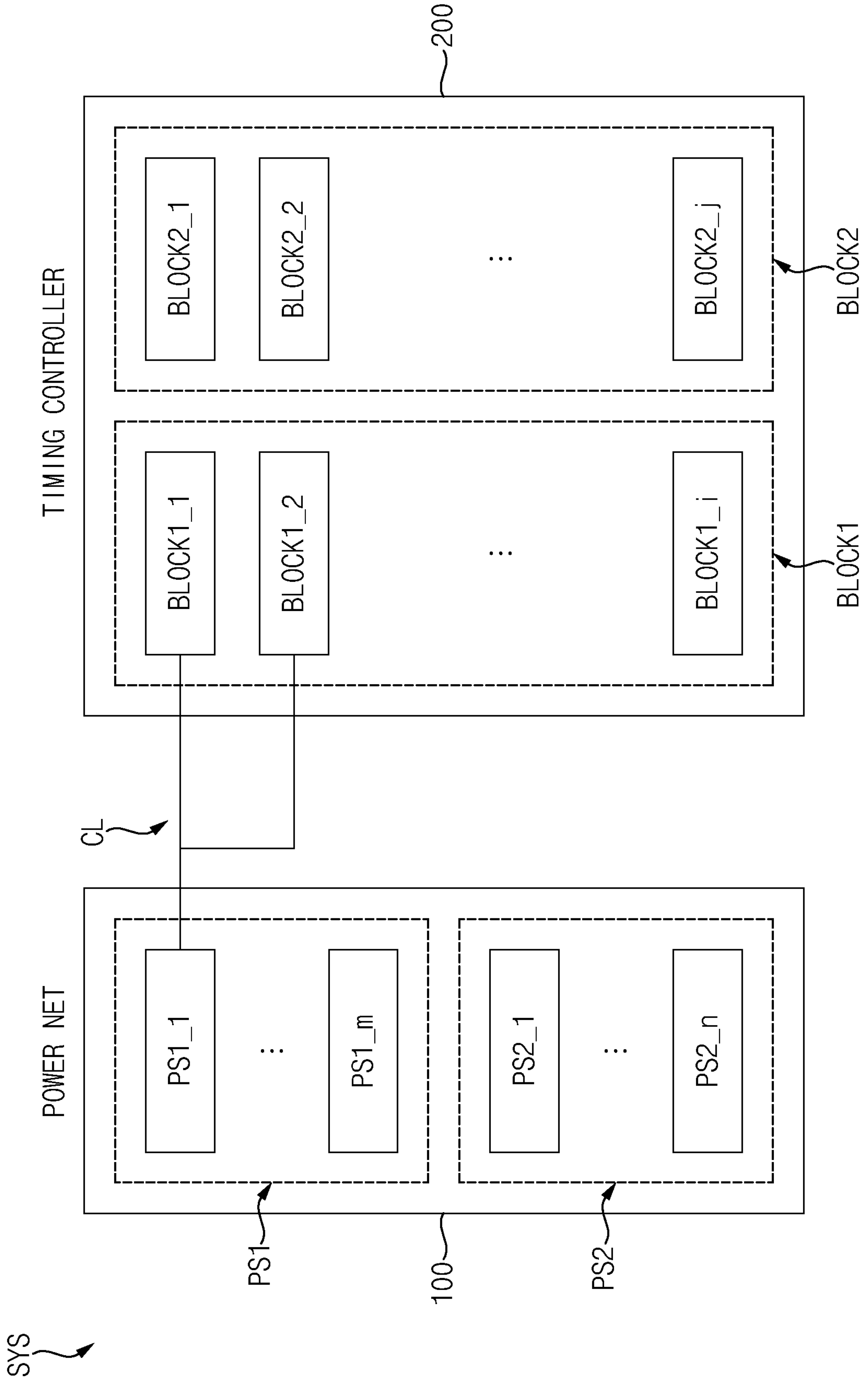
FIGS. 2 and 3 are views for explaining a rated voltage transfer system according to an embodiment of the present disclosure.
Figure 3:
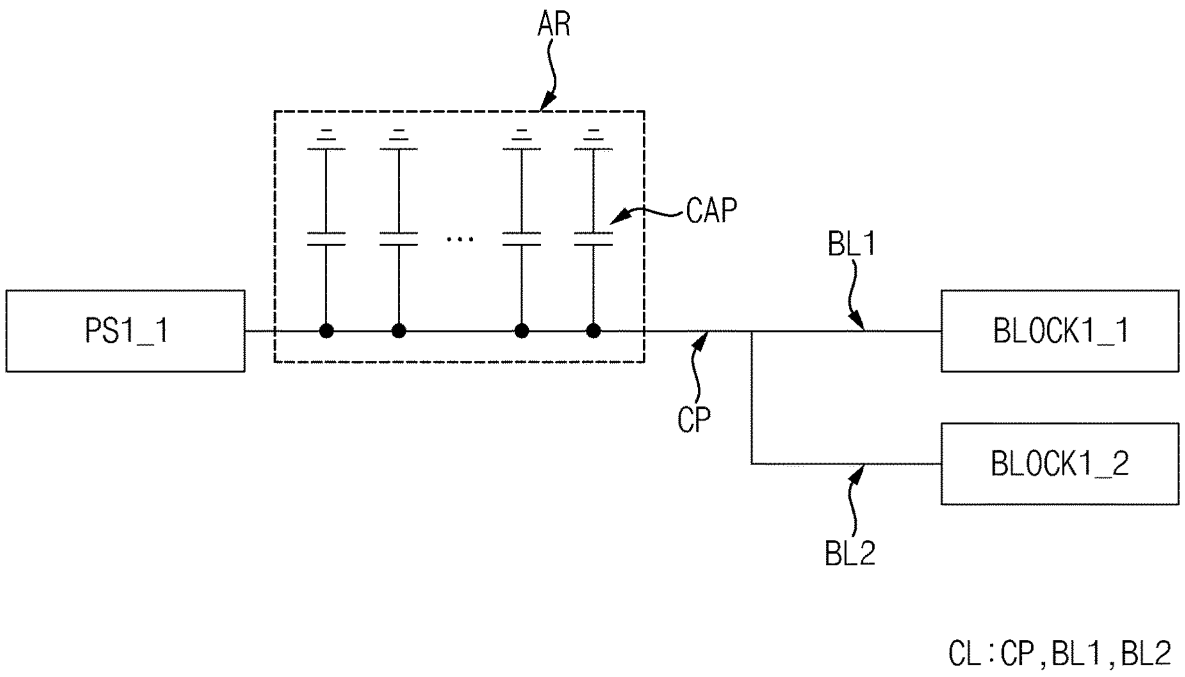

FIGS. 2 and 3 are views for explaining a rated voltage transfer system SYS according to an embodiment of the present disclosure.

Referring to FIG. 2, the rated voltage transfer system SYS may be defined as a system for providing the power PV to the timing controller 200. In this case, the rated voltage transfer system SYS may include the power net 100, the timing controller 200, and a rated voltage transfer line CL.

The power net 100 may include a plurality of power sources. Each of the plurality of power sources may generate a rated voltage.

For example, the power net 100 may include a first power source part PS1 and a second power source part PS2.

The first power source part PS1 may generate a first rated voltage. In an embodiment, the first power source part PS1 may include first to m-th power sources PS1_1 to PS1_*m*, where m is a natural number greater than or equal to 2. Each of the first to m-th power sources PS1_1 to PS1_*m* may generate the first rated voltage.

The second power source part PS2 may generate a second rated voltage different from the first rated voltage. For example, the first rated voltage may be a voltage of about 1.8 V, and the second rated voltage may be a voltage of about 1.05 V. In an embodiment, the second power source part PS2 may include first to n-th power sources PS2_1 to PS2_*n*, where n is a natural number greater than or equal to 2. Each of the first to n-th power sources PS2_1 to PS2_*n* may generate the second rated voltage.

The timing controller 200 may include a plurality of blocks. Each of the plurality of blocks may generate a driving control signal by receiving a corresponding rated voltage.

For example, the timing controller 200 may include a first block part BLOCK1 and a second block part BLOCK2.

The first block part BLOCK1 may generate a driving control signal by receiving the first rated voltage. In an embodiment, the first block part BLOCK1 may include the first to i-th blocks BLOCK1_1 to BLOCK1_*i*, where i is a natural number greater than or equal to 3. Each of the first to i-th blocks BLOCK1_1 to BLOCK1_*i* may receive the first rated voltage. Accordingly, the first to i-th blocks BLOCK1_1 to BLOCK1_*i* may generate different types of driving control signals.

The second block part BLOCK2 may generate a driving control signal by receiving the second rated voltage. In an embodiment, the second block part BLOCK2 may include first to j-th blocks BLOCK2_1 to BLOCK2_*j*, where j is a natural number greater than or equal to 3. Each of the first to j-th blocks BLOCK2_1 to BLOCK2_*j* may receive the second rated voltage. Accordingly, the first to j-th blocks BLOCK2_1 to BLOCK2_*j* may generate different types of driving control signals.

Each of the blocks BLOCK1_1 to BLOCK1_*i* and BLOCK2_1 to BLOCK2_*j* included in the first and second block parts BLOCK1 and BLOCK2 may generate different types of driving control signals. The number of the blocks BLOCK1_1 to BLOCK1_*i* included in the first block part BLOCK1 and the number of the blocks BLOCK2_1 to BLOCK2_*j* included in the second block part BLOCK2 may be same as the number of driving control signals generated by the timing controller 200.

In an embodiment, the blocks BLOCK1_1 to BLOCK1_*i* included in the first block part BLOCK1 may receive the first rated voltage from the power sources PS1_1 to PS1_*m* included in the first power source part PS1. The blocks BLOCK2_1 to BLOCK2_*j* included in the second block part BLOCK2 may receive the second rated voltage from the power sources PS2_1 to PS2_*n* included in the second power source part PS2.

In this case, the space in which the power net 100 can be disposed in the display device DD may be limited. Accordingly, the number of power sources PS1_1 to PS1_*m* included in the first power source part PS1 may be less than the number of blocks BLOCK1_1 to BLOCK1_*i* included in the first block part BLOCK1.

In order to transfer the first rated voltage to each of the blocks BLOCK1_1 to BLOCK1_*i* included in the first block part BLOCK1, at least one of the power sources PS1_1 to PS1_*m* included in the first power source part PS1 needs to be electrically connected to two or more blocks included in the first block part BLOCK1. For example, the power source PS1_1 may be electrically connected to each of the two blocks BLOC1_1 and BLOCK1_2 through the rated voltage transfer line CL.

Similarly, since the space in which the power net 100 can be disposed in the display device DD may be limited, the number of power sources PS2_1 to PS2_*n* included in the second power source part PS2 may be less than the number of blocks BLOCK2_1 to BLOCK2_*j* included in the second block part BLOCK2. Accordingly, in order to transfer the second rated voltage to each of the blocks BLOCK2_1 to BLOCK2_j included in the second block part BLOCK2, at least one of the power sources PS2_1 to PS2_n included in the second power source part PS2 needs to be electrically connected to two or more blocks included in the second block part BLOCK2.

In FIG. 2, for convenience of explanation, only the rated voltage transfer line CL electrically connecting the first power source PS1_1 and the two blocks BLOCK1_1 and BLOCK1_2 to each other is illustrated. In this case, by the rated voltage transfer line CL and other transfer lines not shown, the power sources PS1_1 to PS1_m included in the first power source part PS1 may be electrically connected to the blocks BLOCK1_1 to BLOCK1_i included in the first block part BLOCK1 and the power sources PS2_1 to PS2_n included in the second power source part PS2 may be electrically connected to the blocks BLOCK2_1 to BLOCK2_j included in the second block part BLOCK2.

Accordingly, each of the blocks BLOCK1_1 to BLOCK1_i included in the first block part BLOCK1 may receive the first rated voltage, and the blocks BLOCK2_1 to BLOCK2_j included in the second block part BLOCK2 may receive the second rated voltage.

Hereinafter, the rated voltage transfer system SYS of the present disclosure based on the rated voltage transfer line CL and the power source PS1_1 and the blocks BLOCK1_1 and BLOCK1_2 electrically connected to each other through the rated voltage transfer line CL illustrated in FIG. 2 will be described. In this case, the power source PS1_1 may be referred to as a first power source, the block BLOCK1_1 may be referred to as a first block, and the block BLOCK1_2 may be referred to as a second block.

Referring to FIG. 3, the rated voltage transfer line CL may include a rated voltage application part CP, a capacitor array AR, a first branch line BL1, and a second branch line BL2.

The rated voltage application part CP may be electrically connected to the first power source PS1_1. Accordingly, the first rated voltage may be applied to the rated voltage application part CP.

The capacitor array AR may include at least one capacitor CAP. The capacitor CAP may include a first terminal and a second terminal. The first terminal of the capacitor CAP may be connected to the rated voltage application part CP, and the second terminal may be grounded. The capacitor CAP may serve to stabilize the supply of the first rated voltage.

The first branch line BL1 and the second branch line BL2 may be lines branching from each other. The first branch line BL1 and the second branch line BL2 may be electrically connected to the rated voltage application part CP. Accordingly, the first rated voltage applied to the rated voltage application part CP may be transmitted to each of the first branch line BL1 and the second branch line BL2.

The first branch line BL1 may be electrically connected to the first block BLOCK1_1, and thus, the first rated voltage may be provided to the first block BLOCK1_1. The second branch line BL2 may be electrically connected to the second block BLOCK1_2, and thus, the first rated voltage may be provided to the second block BLOCK1_2.

In this case, the first driving control signal generated by the first block BLOCK1_1 may be of a different type from the second driving control signal generated by the second block BLOCK1_2. For example, the first driving control signal may be the scan driving control signal SCS described with reference to FIG. 1, and the second driving control signal may be the data driving control signal DCS described with reference to FIG. 1.

When signal interference occurs between the first block BLOCK1_1 and the second block BLOCK1_2, noise occurring between the first block BLOCK1_1 and the second block BLOCK1_2 may become a problem. The noise may degrade the quality of signals generated in each of the first block BLOCK1_1 and the second block BLOCK1_2, and thus, the display quality of the display device DD may be degraded.

In order to prevent the generation of the noise, the rated voltage transfer line CL of the present disclosure may include the first branch line BL1 and the second branch line BL2 electrically connected to the rated voltage application part CP. The first block BLOCK1_1 may be electrically connected to the first branch line BL1, and the second block BLOCK1_2 may be electrically connected to the second branch line BL2.

Accordingly, the first block BLOCK1_1 and the second block BLOCK1_2 may be electrically isolated from each other, i.e., noise may not occur between the first block BLOCK1_1 and the second block BLOCK1_2.

Figure 4:
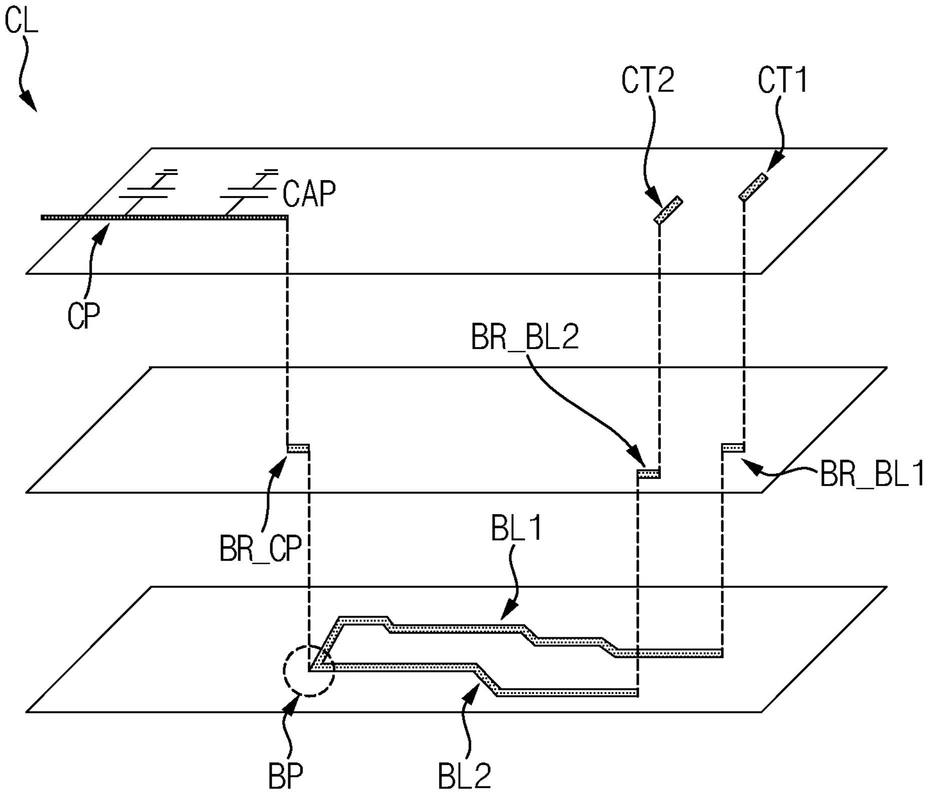
FIGS. 4, 5, and 6 are views for explaining a rated voltage transfer line included in the rated voltage transfer system of FIGS. 2 and 3.
Figure 5:
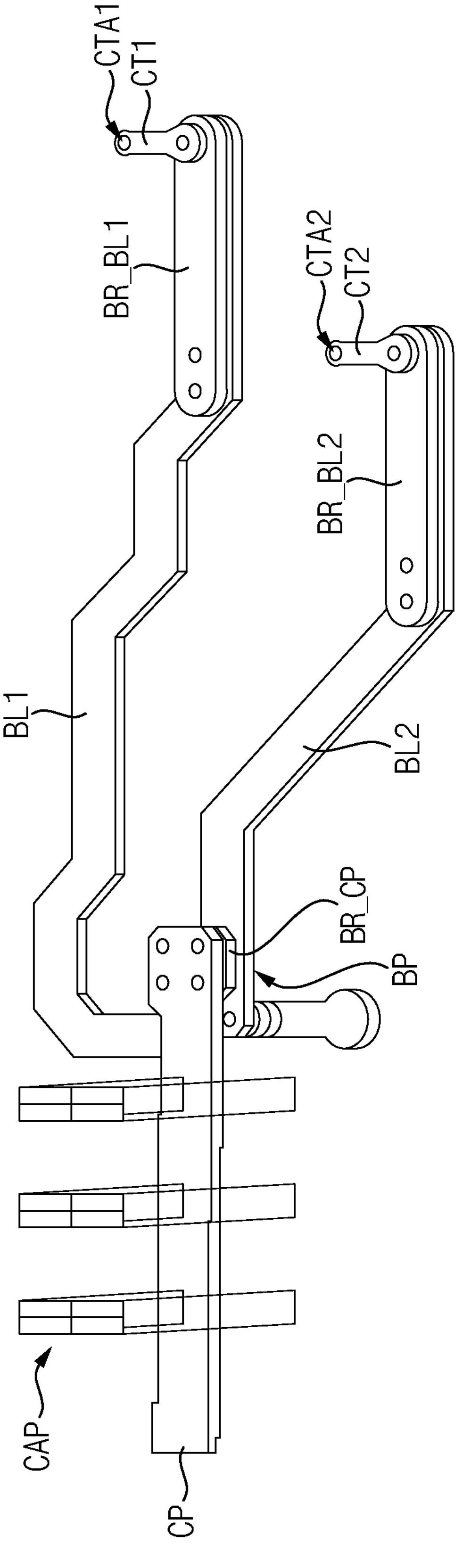
Figure 6:
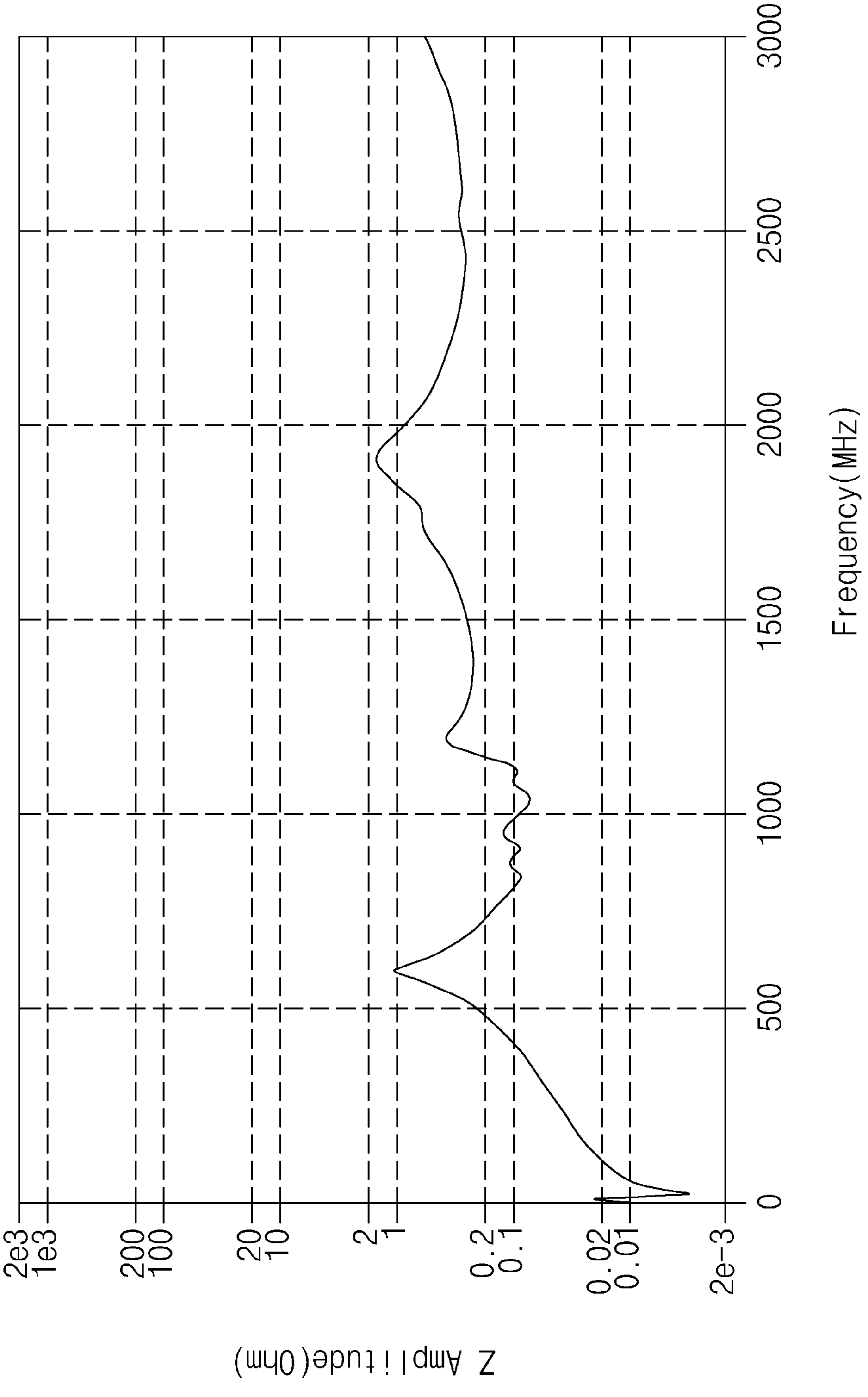

FIGS. 4, 5, and 6 are views for explaining a rated voltage transfer line included in the rated voltage transfer system SYS of FIGS. 2 and 3.

Referring to FIGS. 4 and 5, further referring to FIG. 3, the rated voltage transfer line CL may include the rated voltage application part CP, the capacitor CAP, the first branch line BL1, the second branch line BL2, a first contact part CT1, and a second contact part CT2.

In an embodiment, the first branch line BL1 and the second branch line BL2 may be integrally formed. In this case, the first branch line BL1 and the second branch line BL2 may be referred to as a branch line part.

The branch line part may include a branch part BP. The branch part BP may be a branching point of the first branch line BL1 and the second branch line BL2. That is, the first branch line BL1 and the second branch line BL2 may branch and extend from the branch part BP.

The branch part BP may be electrically connected to the rated voltage application part CP. In an embodiment, between the branch part BP and the rated voltage application part CP, at least one rated voltage transfer electrode electrically connecting the branch part BP and the rated voltage application part CP is disposed.

For example, a rated voltage transfer electrode BR_CP may be disposed between the branch part BP and the rated voltage application part CP, and the rated voltage transfer electrode BR_CP may be electrically connected to the branch part BP and the rated voltage application part CP. Accordingly, the branch part BP may be electrically connected to the rated voltage application part CP by the rated voltage transfer electrode BR_CP.

The first contact part CT1 and the second contact part CT2 may be electrically connected to the first block BLOCK1_1 and the second block BLOCK1_2. For example, the first contact part CT1 may include a first contact area CTA1 electrically contacting a component such as a power ball included in the first block BLOCK1_1, and the second contact portion CT2 may include a second contact area CTA2 electrically contacting a component such as a power ball included in the second block BLOCK1_2.

The first contact part CT1 may be electrically connected to the first branch line BL1. In an embodiment, at least one bridge electrode electrically connecting the first contact part CT1 and the first branch line BL1 may be disposed between the first contact part CT1 and the first branch line BL1.

For example, a first bridge electrode BR_BL1 may be disposed between the first contact part CT1 and the first branch line BL1, and the first bridge electrode BR_BL1 may be electrically contact each of the first contact part CT1 and the first branch line BL1. In this case, the first bridge electrode BR_BL1 may electrically contact a first end of the first branch line BL1 spaced apart from the branch part BP.

The second contact part CT2 may be electrically connected to the second branch line BL2. In an embodiment, at least one bridge electrode electrically connecting the second contact part CT2 and the second branch line BL2 may be disposed between the second contact part CT2 and the second branch line BL2.

For example, a second bridge electrode BR_BL2 may be disposed between the second contact part CT2 and the second branch line BL2, and the second bridge electrode BR_BL2 may be electrically contact each of the second contact part CT2 and the second branch line BL2. In this case, the second bridge electrode BR_BL2 may electrically contact a first end of the second branch line BL2 spaced apart from the branch part BP.

In an embodiment, a first voltage transfer path, which is a path through which the first rated voltage output from the rated voltage application part CP is transferred to the first contact part CT1, may be defined. The first voltage transfer path may include a path sequentially passing through the branch part BP and the first branch line BL1.

More specifically, as shown in FIG. 5, the first rated voltage output from the rated voltage application part CP may be transferred to the first contact part CT1 through a path sequentially passing through the rated voltage transfer electrode BR_CP, the branch part BP, the first branch line BL1, and the first bridge electrode BR_BL1.

In this case, as shown in FIG. 5, when a length of the voltage transfer path via the rated voltage transfer electrode BR_CP and a length of the voltage transfer path via the first bridge electrode BR_BL1 are relatively short, the first voltage transfer path may be substantially the same as the path sequentially passing through the branch part BP and the first branch line BL1.

Similarly, a second voltage transfer path, which is a path through which the first rated voltage output from the rated voltage application part CP is transferred to the second contact part CT2, may be defined. The second voltage transfer path may include a path sequentially passing through the branch part BP and the second branch line BL2.

More specifically, as shown in FIG. 5, the first rated voltage output from the rated voltage application part CP may be transferred to the second contact part CT2 through a path sequentially passing through the rated voltage transfer electrode BR_CP, the branch part BP, the second branch line BL2, and the second bridge electrode BR_BL2.

In this case, as shown in FIG. 5, when a length of the voltage transfer path passing through the rated voltage transfer electrode BR_CP and a length of the voltage transfer path passing through the second bridge electrode BR_BL2 are relatively short, the second voltage transfer path may be substantially the same as the path sequentially passing through the branch part BP and the second branch line BL2.

In addition, a noise voltage transfer path through which a voltage, e.g., a driving control signal generated by the first block BLOCK1_1 electrically connected to the first contact part CT1, applied to the first contact part CT1 is transferred to the second contact part CT2 may be defined. The noise voltage transfer path may include a path sequentially passing through the first branch line BL1, the branch part BP, and the second branch line BL2.

More specifically, as shown in FIG. 5, the voltage applied to the first contact part CT1 may be transmitted to the second contact part CT2 through a path sequentially passing through the first bridge electrode BR_BL1, the first branch line BL1, the branch part BP, the second branch line BL2, and the second bridge electrode BR_BL2.

In this case, the length of the voltage transfer path passing through the first bridge electrode BR_BL1 and the length of the voltage transfer path passing through the second bridge electrode BR_BL2 may be relatively short. Accordingly, the noise voltage transfer path may be substantially the same as the path sequentially passing through the first branch line BL1, the branch part BP, and the second branch line BL2.

When the length of the noise voltage transfer path is relatively short, noise may occur between the driving control signal generated in the first block BLOCK1_1 electrically connected to the first contact part CT1 and the driving control signal generated in the second block BLOCK1_2 electrically connected to the second contact part CT2.

In the present disclosure, each of the length of the first voltage transfer path and the length of the second voltage transfer path may be smaller than the length of the noise voltage transfer path. That is, the length of the noise voltage transfer path may be relatively long.

Accordingly, the first rated voltage may be normally supplied to the first contact part CT1 and the second contact part CT2 through the first voltage transfer path and the second voltage transfer path. At the same time, since the length of the noise voltage transfer path is relatively long, noise may not substantially occur between the first contact part CT1 and the second contact part CT2.

In an embodiment, the rated voltage application part CP, the first contact part CT1 and the second contact part CT2 may be disposed in the same layer. In addition, the rated voltage application part CP, the first contact part CT1 and the second contact part CT2 may be spaced apart from each other.

In an embodiment, the rated voltage transfer electrode BR_CP, the first bridge electrode BR_BL1, and the second bridge electrode BR_BL2 may be disposed in the same layer. In addition, the rated voltage transfer electrode BR_CP, the first bridge electrode BR_BL1, and the second bridge electrode BR_BL2 may be spaced apart from each other.

Referring to FIG. 6, FIG. 6 is a graph illustrating noise occurring between the first contact part CT1 and the second contact part CT2 shown in FIG. 5. The noise may be represented by transfer impedance (Z). In this case, the Y axis represents the transfer impedance in ohms, and the X axis represents the frequency range in MHz in the graph shown in FIG. 6.

When a first voltage is applied to the first contact part CT1 and a first current flow, the noise voltage may also be applied to the second contact part CT2 through the noise voltage transfer path. For example, a second voltage may be applied to the second contact part CT2 and a second current flow.

A value obtained by dividing the second voltage by the second current may be defined as a transfer impedance (Z) of the second contact part CT2 by the first contact part CT1. As the transfer impedance Z is lower, it indicates that the first contact part CT1 and the second contact part CT2 are electrically separated from each other. That is, no noise is generated in the second contact part CT2 by the voltage applied to the first contact part CT1.

As shown in FIG. 6, in the frequency range of about 0 to about 3000 MHz, the transfer impedance Z may be about 2 ohms or less. That is, noise may not substantially occur between the first contact part CT1 and the second contact part CT2.

Figure 7:
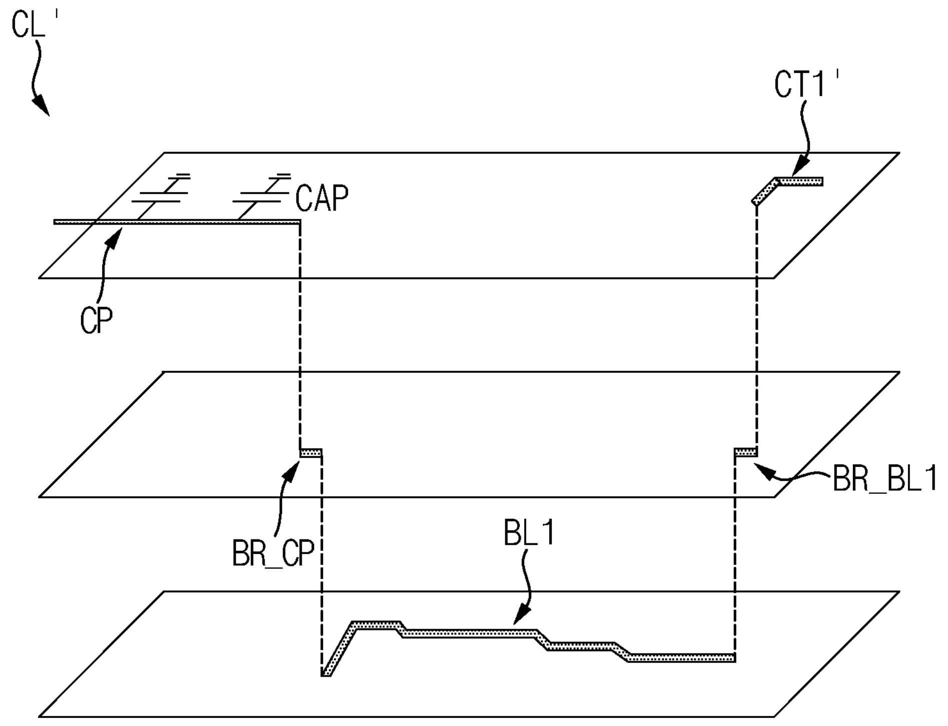
FIGS. 7, 8, and 9 are views for explaining a rated voltage transfer line according to a first comparative embodiment of the present disclosure.
Figure 8:
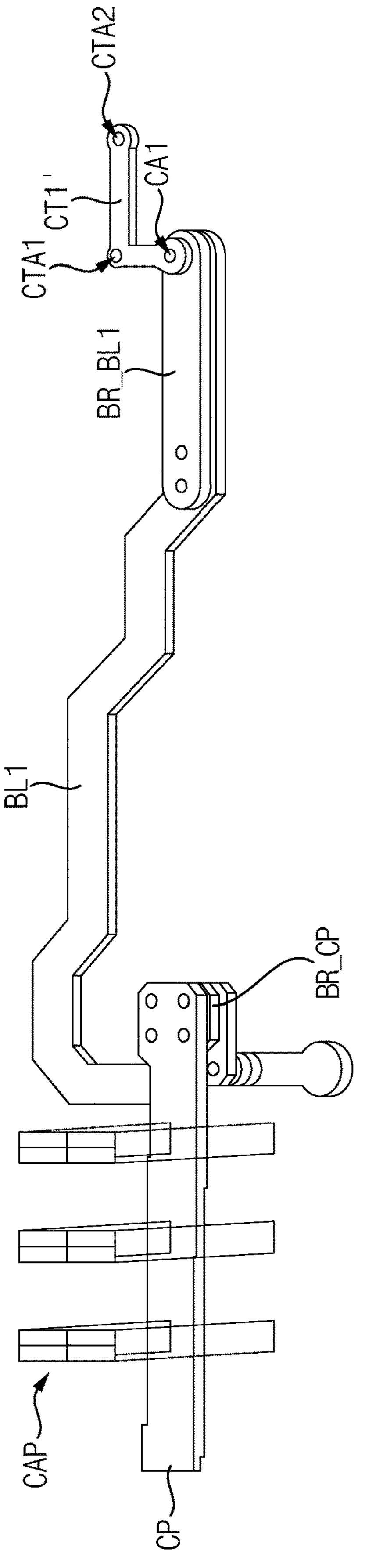
Figure 9:
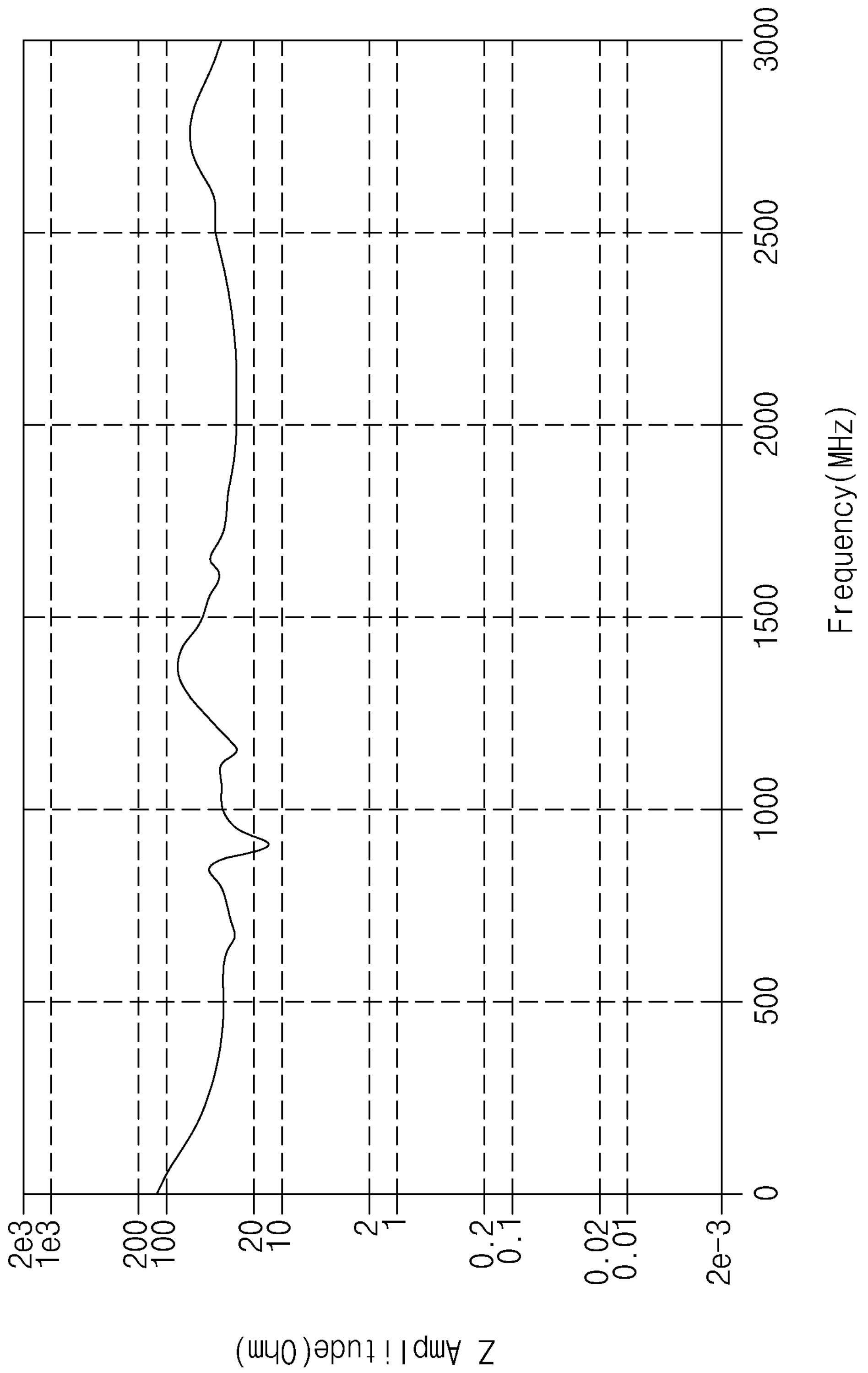

FIGS. 7, 8, and 9 are views for explaining a rated voltage transfer line CL' according to a first comparative embodiment of the present disclosure.

Referring to FIGS. 7 and 8, further referring to FIG. 3, the rated voltage transfer line CL' may include a rated voltage application part CP, a capacitor CAP, a rated voltage transfer electrode BR_CP, a first branch line BL1, a first bridge electrode BR_BL1, and a first contact part CT1'.

The rated voltage application part CP, the capacitor CAP, the rated voltage transfer electrode BR_CP, the first branch line BL1, and the first bridge electrode BR_BL1 included in the rated voltage transfer line CL' may be substantially the same as the rated voltage application part CP, the capacitor CAP, the rated voltage transfer electrode BR_CP, the first branch line BL1, and the first bridge electrode BR_BL1 included in the rated voltage transfer line CL described with reference to FIGS. 4 and 5. Therefore, descriptions of repeated contents are omitted.

The first contact part CT1' may be electrically connected to the first branch line BL1 through the first bridge electrode BR_BL1. For example, the first contact part CT1' may electrically contact the first bridge electrode BR_BL1 in a first contact area CA1.

Compared to the first contact part CT1 described with reference to FIG. 5, the first contact part CT1' may be electrically connected to each of the first and second blocks BLOCK1_1 and BLOCK1_2. For example, the first contact part CT1' may include a first contact area CTA1 electrically contacting a component such as a power ball included in the first block BLOCK1_1 and a second contact area CTA2 electrically contacting a component such as a power ball included in the second block BLOCK1_2.

In this case, as shown in FIG. 8, the first contact area CA1, the first contact area CTA1, and the second contact area CTA2 may be spaced apart from each other.

A first voltage transfer path, which is a path through which the first rated voltage output from the rated voltage application part CP is transferred to the first contact area CTA1 of the first contact part CT1' may be defined and a second voltage transfer path, which is a path through which the first rated voltage output from the rated voltage application part CP is transferred to the second contact area CTA2 of the first contact part CT1' may be defined in the rated voltage transfer line CL'.

In addition, a noise voltage transfer path through which a voltage, e.g., a driving control signal generated in the first block BLOCK1_1 electrically connected to the first contact area CTA1 of the first contact part CT1, applied to the first contact area CTA1 of the first contact part CT1' is transferred to the second contact area CTA2 of the first contact part CT1' may be defined.

Each of the first voltage transfer path and the second voltage transfer path may include a path sequentially passing through the rated voltage transfer electrode BR_CP, the first branch line BL1, and the first bridge electrode BR_BL1. The noise voltage transfer path may include a path passing between the first contact area CTA1 and the second contact area CTA2 within the first contact part CT1'.

In this case, as shown in FIG. 8, each of the length of the first voltage transfer path and the length of the second voltage transfer path in the rated voltage transfer line CL' may be greater than the length of the noise voltage transfer path. That is, the length of the noise voltage transfer path may be relatively small. Accordingly, noise may occur between the drive control signal generated from the first block BLOCK1_1 electrically connected to the first contact area CTA1 and the drive generated from the second block BLOCK1_2 electrically connected to the second contact area CTA2.

Referring to FIG. 9, FIG. 9 is a graph illustrating noise occurring between the first contact area CTA1 and the second contact area CTA2. The noise may be represented by a transfer impedance (Z). In this case, the Y axis represents the transfer impedance in ohms, and the X axis represents the frequency range in MHz in the graph shown in FIG. 9.

When a first voltage is applied to the first contact area CTA1 and a first current flow, a noise voltage may also be applied to the second contact area CTA2 through the noise voltage transfer path. For example, a second voltage may be applied to the second contact area CTA2 and a second current may flow.

A value obtained by dividing the second voltage by the second current may be defined as a transfer impedance Z of the second contact area CTA2 by the first contact area CTA1. As the transfer impedance Z is lower, it indicates that the first contact area CTA1 and the second contact area CTA2 are electrically separated from each other.

As shown in FIG. 9, in a frequency range of about 0 to about 3000 MHz, the transfer impedance Z may be about 10 ohms or more. That is, relatively large noise may occur between the first contact area CTA1 and the second contact area CTA2.

As shown in FIGS. 8 and 9, when the first contact area CTA1 electrically connected to the first block BLOCK1_1 and the second contact area CTA2 electrically connected to the second block BLOCK1_2 are not sufficiently electrically separated from each other in the rated voltage transfer line CL', relatively large noise may occur.

In contrast, as shown in FIGS. 5 and 6, when the first contact part CT1 electrically connected to the first block BLOCK1_1 and the second contact part CT2 electrically connected to the second block BLOCK1_2 are sufficiently electrically separated from each other in the rated voltage transfer line CL, noise may not substantially occur.

Figure 10:
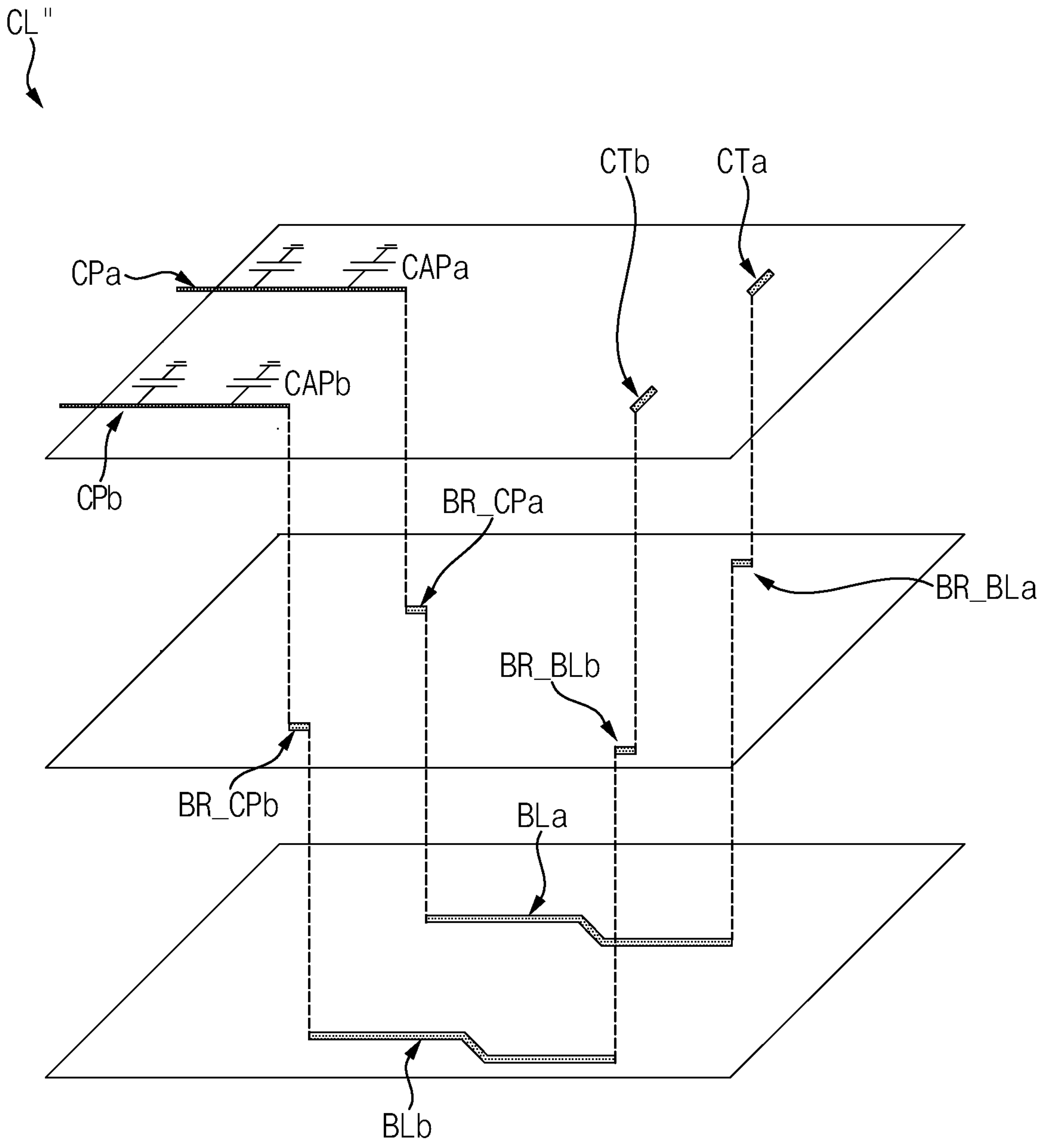
FIGS. 10, 11, and 12 are views for explaining a rated voltage transfer line according to a second comparative embodiment of the present disclosure.
Figure 11:
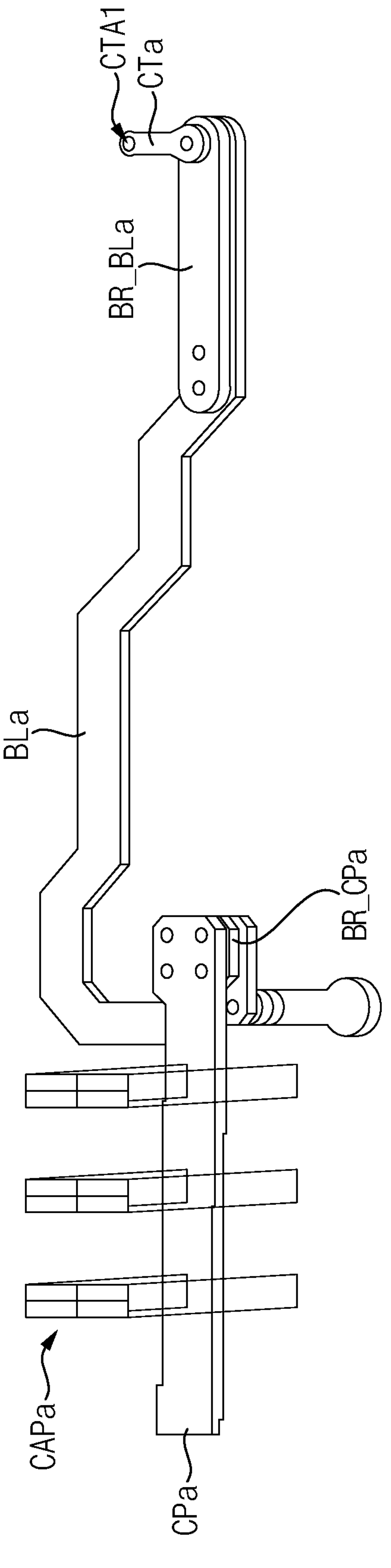
Figure 12:
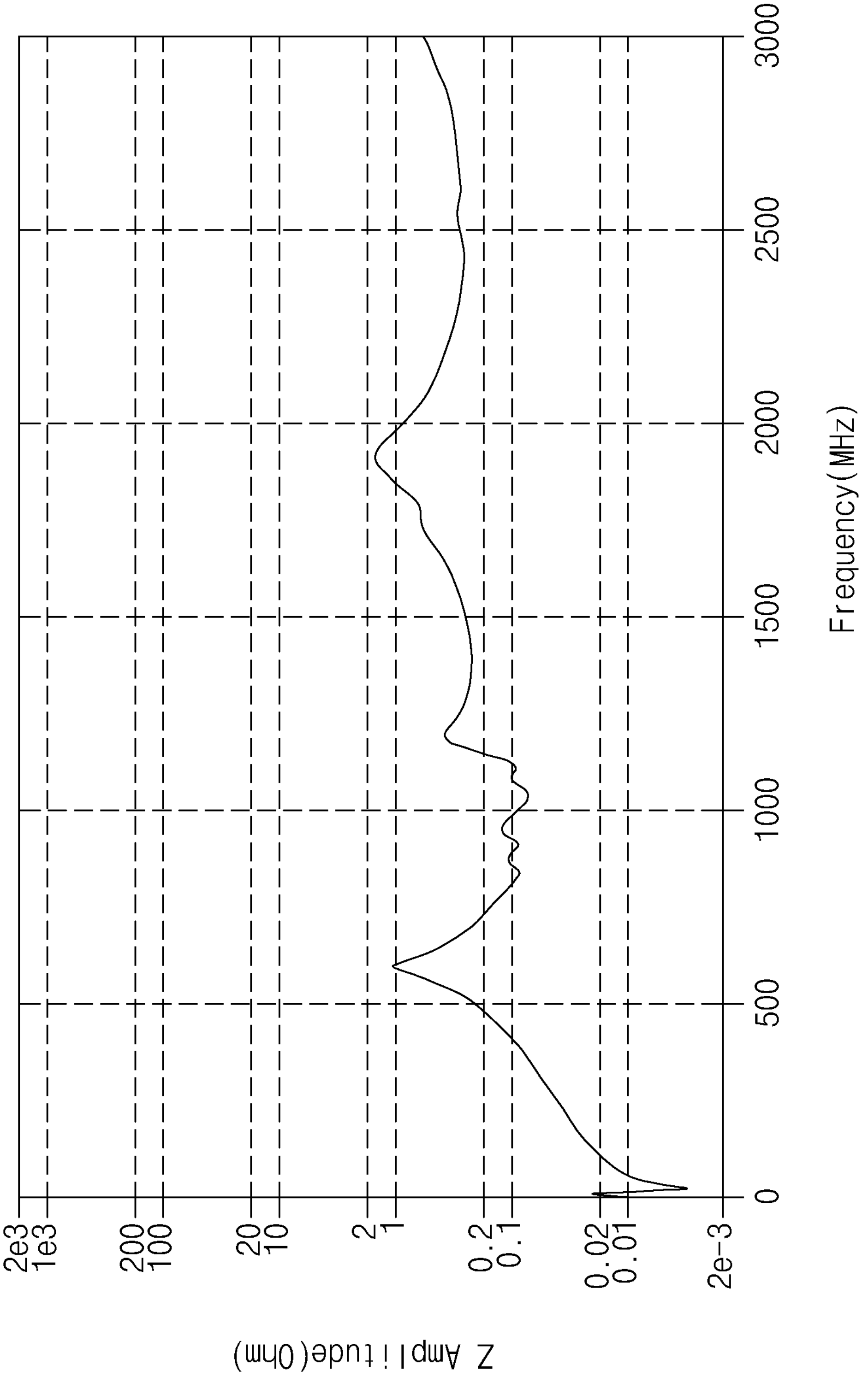

FIGS. 10, 11, and 12 are views for explaining a rated voltage transfer line CL" according to a second comparative embodiment of the present disclosure.

Referring to FIGS. 10 and 11, further referring to FIG. 2, a rated voltage transfer line CL" may include first and second rated voltage application parts CPa and CPb, first and second capacitors CAPa and CAPb, first and second rated voltage transfer electrodes BR_CPa and BR_CPb, first and second lines BLa and BLb, first and second bridge electrodes BR_BLa and BR_BLb, and first and second contact parts CTa and CTb.

The first rated voltage application part CPa, the first capacitor CAPa, the first rated voltage transfer electrode BR_CPa, the first line BLa, the first bridge electrode BR_BLa, and the first contact part CTa may be substantially the same as the second rated voltage application part CPb, the second capacitor CAPb, the second rated voltage transfer electrode BR_CPb, the second line BLb, the second bridge electrode BR_BLb, and the second contact part CTb, respectively. Therefore, descriptions of repeated contents are omitted below.

The first rated voltage application part CPa may be electrically connected to the first power source PS1_1. Accordingly, the first rated voltage may be applied to the first rated voltage application part CPa.

The second rated voltage application part CPb may also be electrically connected to the first power source PS1_1. Alternatively, the second rated voltage applying part CPb may be electrically connected to one of the other power sources PS1_2 to PS1_m included in the first power source part PS1. Accordingly, the first rated voltage may also be applied to the second rated voltage application part CPb.

A first terminal of the first capacitor CAPa may be connected to the first rated voltage application part CPa, and a second terminal of the first capacitor CAPa may be grounded. The first capacitor CAPa may serve to stabilize the supply of the first rated voltage supplied to the first rated voltage application part CPa. A first terminal of the second capacitor CAPb may be connected to the second rated voltage application part CPb, and a second terminal of the second capacitor CAPb may be grounded. The second capacitor CAPb may serve to stabilize the supply of the first rated voltage supplied to the second rated voltage application part CPb.

The first line BLa may be electrically connected to the first rated voltage application part CPa through the first rated voltage transfer electrode BR_CPa. The second line BLb may be electrically connected to the second rated voltage application part CPb through the second rated voltage transfer electrode BR_CPb.

The first contact portion CTa may be electrically connected to the first line BLa through the first bridge electrode BR_BLa. The second contact part CTb may be electrically connected to the second line BLb through the second bridge electrode BR_BLb.

The first contact portion CTa may be electrically connected to the first block BLOCK1_1. For example, the first contact part CTa may include a first contact area CTA1 electrically contacting a component such as a power ball included in the first block BLOCK1_1.

The second contact part CTb may be electrically connected to the second block BLOCK1_2. For example, the second contact portion CTb may include a second contact area CTA2 electrically contacting a component such as a power ball included in the second block BLOCK1_2.

In the rated voltage transfer line CL", the first contact part CTa and the second contact part CTb may be physically separated from each other. In other words, the rated voltage transfer line CL" may not include a line (or electrode) electrically connecting the first contact part CTa and the second contact part CTb to each other. Accordingly, noise may not substantially occur between the first contact part CTa and the second contact part CTb.

In this case, the first rated voltage is stably applied to each of the first block BLOCK1_1 electrically connected to the first contact part CTa and the second block BLOCK1_2 electrically connected to the second contact part CTb, the first terminal of the first capacitor CAPa should be connected to the first rated voltage application part CPa, and the first terminal of the second capacitor CAPb should be connected to the second rated voltage application part CPb. Accordingly, a relatively large space for disposing the first capacitor CAPa and the second capacitor CAPb may be required.

Compared to the rated voltage transfer line CL described with reference to FIGS. 4 and 5, the rated voltage transfer line CL" should include a relatively large number of capacitors. That is, more space for disposing the rated voltage transfer line CL" is required compared to the space for disposing the rated voltage transfer line CL.

Referring to FIG. 12, FIG. 12 is a graph illustrating noise occurring between the first contact part CTa and the second contact part CTb shown in FIG. 11. The noise may be represented by a transfer impedance (Z). In this case, the Y axis represents the transfer impedance in ohms, and the X axis represents the frequency range in MHz in the graph shown in FIG. 12.

When a first voltage is applied to the first contact part CTa and a first current flow, a noise voltage may also be applied to the second contact part CTb due to electrical interference between the first contact part CTa and the second contact part CTb. For example, a second voltage may be applied to the second contact part CTb and a second current may flow.

A value obtained by dividing the second voltage by the second current may be defined as a transfer impedance Z of the second contact part CTb by the first contact part CTa. As the transfer impedance Z is lower, it indicates that the first contact part CTa and the second contact part CTb are electrically separated from each other.

As shown in FIG. 12, in a frequency range of about 0 to about 3000 MHz, the transfer impedance Z may be about 2 ohms or less. That is, noise may not substantially occur between the first contact part CTa and the second contact part CTb.

As shown in FIGS. 6 and 12, the transfer impedance between the first contact part CT1 and the second contact part CT2 of the rated voltage transfer line CL may be substantially the same as the transfer impedance between the first contact part CTa and the second contact part CTb of the rated voltage transfer line CL'. That is, the rated voltage transfer line CL described with reference to FIGS. 4 and 5 can effectively prevent noise occurrence between the first contact part CT1 and the second contact part CT2, and is superior in terms of space efficiency compared to the rated voltage transfer line CL' described with reference to FIGS. 10 and 11.

Figure 13:
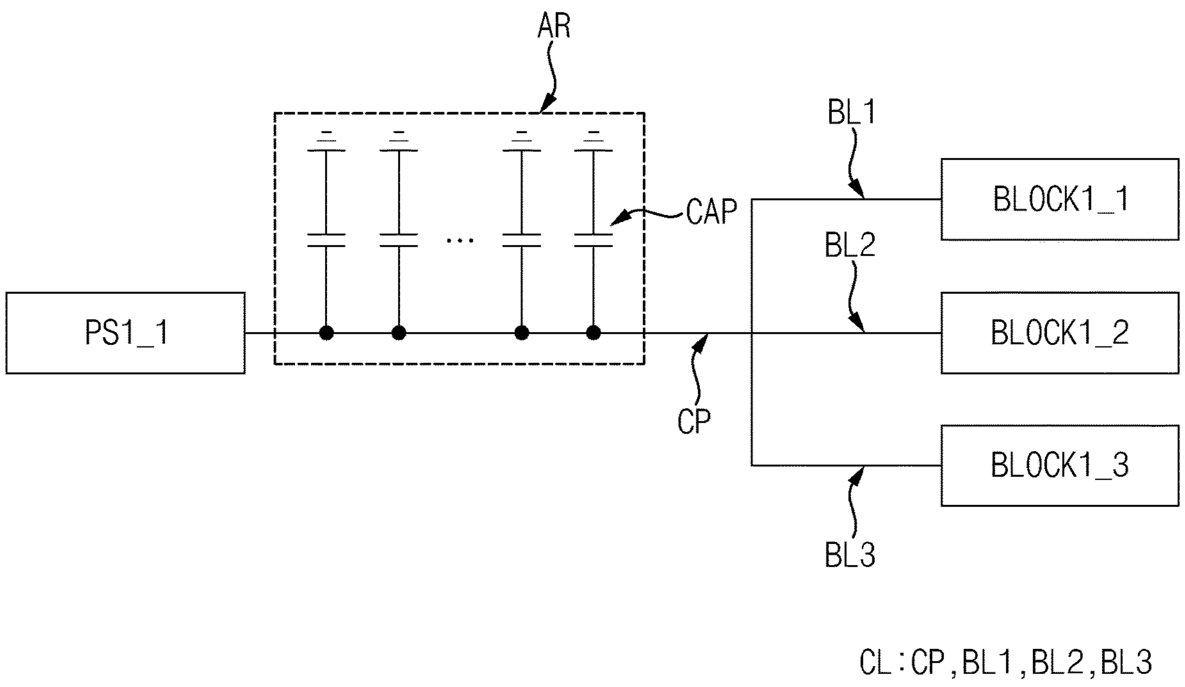
FIG. 13 is a view for explaining a rated voltage transfer system according to another embodiment of the present disclosure.

FIG. 13 is a view for explaining a rated voltage transfer system according to another embodiment of the present disclosure.

Referring to FIG. 13, the rated voltage transfer line CL may include the rated voltage application part CP, the capacitor array AR, the first branch line BL1, the second branch line BL2, and a third branch line BL3.

Compared with the rated voltage transfer line CL according to an embodiment of the present disclosure described with reference to FIG. 3, the rated voltage transfer line CL of FIG. 13 according to another embodiment of the present disclosure includes the third branch line BL3.

The first, second, and third branch lines BL1, BL2, and BL3 may be branched lines. The first, second, and third branch lines BL1, BL2, and BL3, sometimes called the first, second, and third branch lines BL1, BL2, and BL3, may be electrically connected to the rated voltage application part CP. Accordingly, the first rated voltage applied to the rated voltage application part CP may be transmitted to each of the first, second, and third branch lines BL1, BL2, and BL3.

The first branch line BL1 may be electrically connected to the first block BLOCK1_1, and thus, the first rated voltage may be provided to the first block BLOCK1_1.

The second branch line BL2 may be electrically connected to the second block BLOCK1_2, and thus, the first rated voltage may be provided to the second block BLOCK1_2.

The third branch line BL3 may be electrically connected to the third block BLOCK1_3, and thus, the first rated voltage may be provided to the third block BLOCK1_3. In this case, the third block BLOCK1_3 may be any block included in the first block part BLOCK1 described with reference to FIG. 2.

Figure 14:
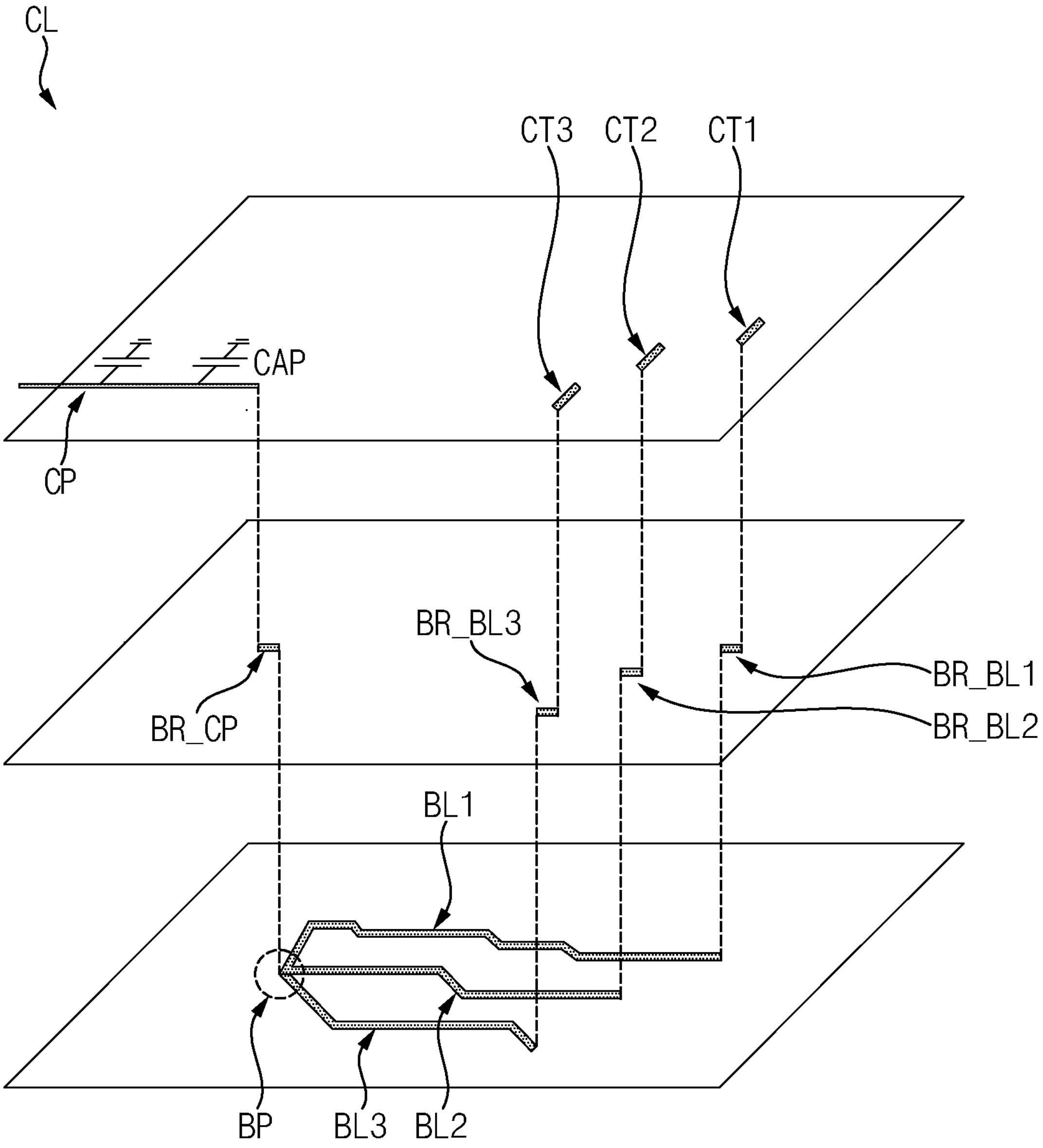
FIGS. 14 and 15 are views for explaining a rated voltage transfer line included in the rated voltage transfer system of FIG. 13.
Figure 15:
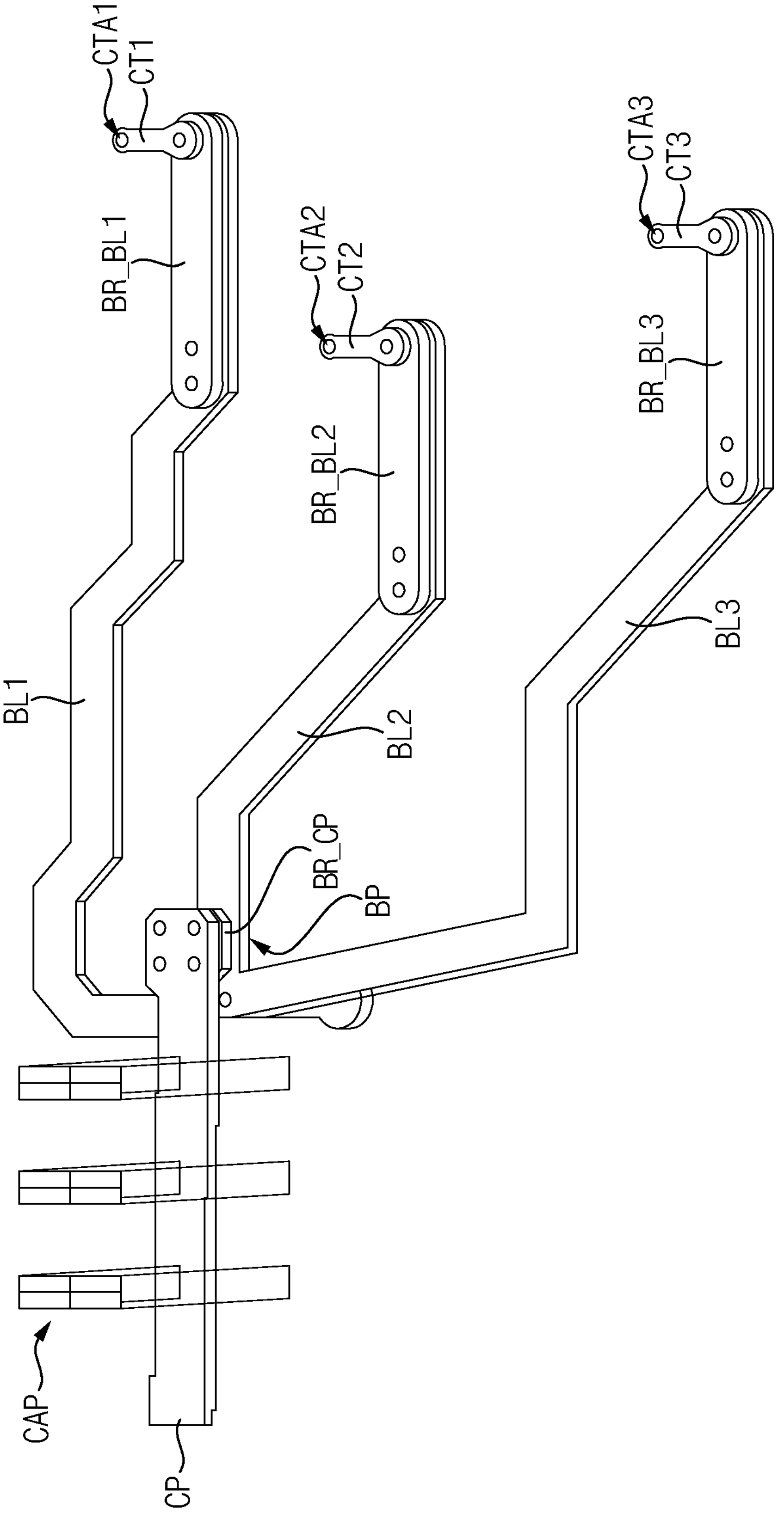

FIGS. 14 and 15 are views for explaining a rated voltage transfer line CL included in the rated voltage transfer system of FIG. 13.

Referring to FIGS. 14 and 15, further referring to FIG. 13, the rated voltage transfer line CL may include the rated voltage application part CP, the capacitor CAP, the first branch line BL1, the second branch line BL2, the third branch line BL3, the first contact part CT1, the second contact part CT2, and a third contact part CT3.

In an embodiment, the first, second, and third branch lines BL1, BL2, and BL3 may be integrally formed. In this case, the first, second, and third branch lines BL1, BL2, and BL3 may be referred to as branch line part.

The branch line part may include a branch part BP. The branch part BP may be a branching point of the first, second, and third branch lines BL1, BL2, and BL3. That is, the first, second, and third branch lines BL1, BL2, and BL3 may branch and extend from the branch part BP.

The branch part BP may be electrically connected to the rated voltage application part CP. In an embodiment, between the branch part BP and the rated voltage application part CP, at least one rated voltage transfer electrode electrically connecting the branch part BP and the rated voltage application part CP may be disposed.

For example, the rated voltage transfer electrode BR_CP may be disposed between the branch part BP and the rated voltage application part CP, and the rated voltage transfer electrode BR_CP may be electrically connected to each of the branch part BP and the rated voltage application part CP. Accordingly, the branch part BP may be electrically connected to the rated voltage application part CP by the rated voltage transfer electrode BR_CP.

The first, second, and third contact parts CT1, CT2, and CT3 may be electrically connected to the first, second, and third blocks BLOCK1_1, BLOCK1_2, and BLOCK1_3. For example, the first contact part CT1 may include a first contact area CTA1 electrically contacting a component such as a power ball included in the first block BLOCK1_1, the second contact part CT2 may include a second contact area CTA2 electrically contacting a component such as a power ball included in the second block BLOCK1_2, and the third contact part CT3 may include a third contact area CTA3 electrically contacting a component such as a power ball included in the third block BLOCK1_3.

The first contact part CT1 may be electrically connected to the first branch line BL1. In an embodiment, at least one bridge electrode electrically connecting the first contact part CT1 and the first branch line BL1 may be disposed between the first contact part CT1 and the first branch line BL1.

For example, a first bridge electrode BR_BL1 may be disposed between the first contact part CT1 and the first branch line BL1, and the first bridge electrode BR_BL1 may electrically contact each of the first contact part CT1 and the first branch line BL1. In this case, the first bridge electrode BR_BL1 may electrically contact the first end of the first branch line BL1 spaced apart from the branch part BP.

The second contact part CT2 may be electrically connected to the second branch line BL2. In an embodiment, at least one bridge electrode electrically connecting the second contact part CT2 and the second branch line BL2 may be disposed between the second contact part CT2 and the second branch line BL2.

For example, a second bridge electrode BR_BL2 may be disposed between the second contact part CT2 and the second branch line BL2, and the second bridge electrode BR_BL2 may electrically contact each of the second contact part CT2 and the second branch line BL2. In this case, the second bridge electrode BR_BL2 may electrically contact the first end of the second branch line BL2 spaced apart from the branch part BP.

The third contact part CT3 may be electrically connected to the third branch line BL3. In an embodiment, at least one bridge electrode electrically connecting the third contact part CT3 and the third branch line BL3 may be disposed between the third contact part CT3 and the third branch line BL3.

For example, a third bridge electrode BR_BL3 may be disposed between the third contact part CT3 and the third branch line BL3, and the third bridge electrode BR_BL3 may electrically contact each of the third contact part CT3 and the third branch line BL3. In this case, the third bridge electrode BR_BL3 may electrically contact the first end of the third branch line BL3 spaced apart from the branch part BP.

In an embodiment, a first voltage transfer path, which is a path through which the first rated voltage output from the rated voltage application part CP is transferred to the first contact part CT1, may be defined. The first voltage transfer path may include a path sequentially passing through the branch part BP and the first branch line BL1.

In addition, a second voltage transfer path, which is a path through which the first rated voltage output from the rated voltage application part CP is transferred to the second contact part CT2, may be defined. The second voltage transfer path may include a path sequentially passing through the branch part BP and the second branch line BL2.

In addition, a third voltage transfer path, which is a path through which the first rated voltage output from the rated voltage application part CP is transferred to the third contact part CT3, may be defined. The third voltage transfer path may include a path sequentially passing through the branch part BP and the third branch line BL3.

In this case, a first noise voltage transfer path through which a voltage, e.g., a driving control signal generated in the third block BLOCK1_3 electrically connected to the third contact part CT3, applied to the third contact part CT3 is transferred to the first contact part CT1 may be defined. The first noise voltage transfer path may include a path sequentially passing through the third branch line BL3, the branch part BP, and the first branch line BL1.

In the present disclosure, as shown in FIG. 15, a length of the first noise voltage transfer path may be greater than a length of the first voltage transfer path, a length of the second voltage transfer path, and a length of the third voltage transfer path, respectively. That is, the length of the first noise voltage transfer path may be relatively long, and accordingly, noise due to the third contact part CT3 may not substantially occur in the first contact part CT1.

Similarly, a second noise voltage transfer path through which the voltage applied to the third contact part CT3 is transferred to the second contact part CT2 may be defined. The second noise voltage transfer path may include a path sequentially passing through the third branch line BL3, the branch part BP, and the second branch line BL2.

In the present disclosure, as shown in FIG. 15, a length of the second noise voltage transfer path may be greater than the length of the first voltage transfer path, the length of the second voltage transfer path, and the length of the third voltage transfer path, respectively. That is, the length of the second noise voltage transfer path may be relatively long, and accordingly, noise due to the third contact part CT3 may not substantially occur in the second contact part CT2.

The present disclosure can be applied to various display devices. For example, the present disclosure is applicable to various display devices such as display devices for vehicles, ships and aircraft, portable communication devices, display devices for exhibition or information transmission, medical display devices, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A rated voltage transfer line comprising:

a rated voltage application part to which a first rated voltage is applied;

at least one capacitor including a first terminal connected to the rated voltage application part and a second terminal that is grounded;

a branch line part including a branch part electrically connected to the rated voltage application part and first and second branch lines branching and extending from the branch part;

a first contact part electrically connected to a first end of the first branch line spaced apart from the branch part; and a second contact part electrically connected to a first end of the second branch line spaced apart from the branch part.

2. The rated voltage transfer line of claim 1, further comprising:

at least one rated voltage transfer electrode disposed between the rated voltage application part and the branch part, and electrically connecting the rated voltage application part and the branch part to each other.

3. The rated voltage transfer line of claim 1, further comprising:

at least one first bridge electrode disposed between the first contact part and the first end of the first branch line, and electrically connecting the first contact part and the first end of the first branch line to each other; and at least one second bridge electrode disposed between the second contact part and the first end of the second branch line, and electrically connecting the second contact part and the first end of the second branch line to each other.

4. The rated voltage transfer line of claim 1, wherein, each of a length of a first voltage transfer path defined as a path through which the first rated voltage output from the rated voltage application part is transferred to the first contact part and a length of a second voltage transfer path defined as a path through which the first rated voltage output from the rated voltage application part is transferred to the second contact part is smaller than a length of a noise voltage transfer path from the first contact part to the second contact part.

5. The rated voltage transfer line of claim 4, wherein the noise voltage transfer path includes a path sequentially passing through the first branch line, the branch part, and the second branch line.

6. The rated voltage transfer line of claim 4, wherein the first voltage transfer path includes a path sequentially passing through the branch part and the first branch line, and the second voltage transfer path includes a path sequentially passing through the branch part and the second branch line.

7. The rated voltage transfer line of claim 1, wherein the branch line part further includes:

a third branch line branching and extending from the branch part.

8. The rated voltage transfer line of claim 7, further comprising:

a third contact part electrically connected to a first end of the third branch line spaced apart from the branch part.

9. The rated voltage transfer line of claim 8, wherein, a length of a third voltage transfer path defined as a path through which the first rated voltage output from the rated voltage application part is transmitted to the third contact part is smaller than a length of a first noise voltage transfer path from the third contact part to the first contact part and is smaller than a length of a second noise voltage transfer path from the third contact part to the second contact part.

10. The rated voltage transfer line of claim 9, wherein the first noise voltage transfer path includes a path sequentially passing through the third branch line, the branch part, and the first branch line, and the second noise voltage transfer includes a path sequentially passing through the third branch line, the branch part, and the second branch line.

11. The rated voltage transfer line of claim 9, wherein the third voltage transfer path includes a path sequentially passing through the branch part and the third branch line.

12. The rated voltage transfer line of claim 1, wherein the rated voltage application part, the first contact part, and the second contact part are disposed in a same layer as each other.

13. The rated voltage transfer line of claim 12, wherein the rated voltage application part, the first contact part, and the second contact part are spaced apart from each other.

14. A rated voltage transfer system comprising:

a power net including a first power source that provides a first rated voltage;

a timing controller generating different types of driving control signals by using the first rated voltage; and a rated voltage transfer line electrically connecting the first power source to the timing controller, wherein the rated voltage transfer line includes:

a rated voltage application part electrically connected to the first power source;

at least one capacitor including a first terminal connected to the rated voltage application part and a second terminal that is grounded;

a branch line part including a branch part electrically connected to the rated voltage application part and first and second branch lines branching and extending from the branch part;

a first contact part electrically connected to a first end of the first branch line spaced apart from the branch part; and a second contact part electrically connected to a first end of the second branch line spaced apart from the branch part.

15. The rated voltage transfer system of claim 14, wherein, each of a length of a first voltage transfer path defined as a path through which the first rated voltage output from the rated voltage application part is transferred to the first contact part and a length of a second voltage transfer path defined as a path through which the first rated voltage output from the rated voltage application part is transferred to the second contact part is smaller than a length of a noise voltage transfer path from the first contact part to the second contact part.

16. The rated voltage transfer system of claim 15, wherein the noise voltage transfer path includes a path sequentially passing through the first branch line, the branch part, and the second branch line.

17. The rated voltage transfer system of claim 15, wherein the first voltage transfer path includes a path sequentially passing through the branch part and the first branch line, and the second voltage transfer path includes a path sequentially passing through the branch part and the second branch line.

18. The rated voltage transfer system of claim 14, wherein the rated voltage application part, the first contact part, and the second contact part are disposed in a same layer as each other.

19. The rated voltage transfer system of claim 18, wherein the rated voltage application part, the first contact part, and the second contact part are spaced apart from each other.

* * * * *